United States Patent [19]

Allan

[11] Patent Number: 5,194,112
[45] Date of Patent: Mar. 16, 1993

[54] METHOD OF APPLYING A FIBER OPTIC ADHESIVE TO A FIBER OPTIC MATERIAL

[75] Inventor: Barry D. Allan, Huntsville, Ala.

[73] Assignee: The United States of America as represented by the Secretary of the Army, Washington, D.C.

[21] Appl. No.: 915,566

[22] Filed: Jul. 20, 1992

Related U.S. Application Data

[62] Division of Ser. No. 584,664, Sep. 14, 1990.

[51] Int. Cl.$^5$ .................... B65H 54/04; B65H 55/04; G02B 6/16
[52] U.S. Cl. .................... 156/169; 156/166; 156/172; 156/173; 156/306.3; 156/330.9; 242/173; 427/163
[58] Field of Search ............ 242/173, 172; 156/169, 156/166, 172, 173, 175, 306.3, 326, 331.4, 330.9; 427/163, 425; 524/572, 310

[56] References Cited

U.S. PATENT DOCUMENTS

| | | | |
|---|---|---|---|
| 2,639,097 | 5/1953 | Scott, Jr. | 242/173 |
| 2,732,817 | 1/1956 | Robinson | 242/173 |
| 3,217,989 | 11/1965 | Vogel | 242/173 |
| 3,948,829 | 4/1976 | Babayan . | |
| 4,529,536 | 7/1985 | Allen . | |
| 4,925,126 | 5/1990 | Schotter | 156/430 X |
| 4,950,049 | 8/1990 | Darsey et al. | 156/166 X |
| 4,960,068 | 10/1990 | Schotter | 118/125 X |
| 4,978,413 | 12/1990 | Schotter | 118/125 X |
| 5,064,490 | 11/1991 | Chapin et al. | 156/173 X |
| 5,116,451 | 5/1992 | Le Compte | 242/173 X |

FOREIGN PATENT DOCUMENTS

| | | |
|---|---|---|
| 0088845 | 8/1978 | Japan . |
| 0180678 | 11/1982 | Japan . |
| 0191766 | 11/1983 | Japan . |
| 01130357 | 6/1986 | Japan . |

*Primary Examiner*—Jeff H. Aftergut
*Attorney, Agent, or Firm*—James T. Deaton; Freddie M. Bush

[57] ABSTRACT

Disclosed is a method and a fiber optic adhesive which composition is applied to a fiber optic having a buffer coat thereon and is, subsequently, partially cured to a tacky outer surface while being wound onto a bobbin from which the adhesively coated fiber optic material is to payout during use. The adhesively coated fiber optic material must be cured to a tacky cure while being wound onto a bobbin. The cured adhesive composition functions to hold the fiber optic material in place on the bobbin during storage and allows consistent payout during use of the fiber optic material. The typical composition of the fiber optic adhesive comprises hydroxyterminated polybutadiene from about 88.14 to about 92.48 percent by weight, isophorone diisocyanate from about 6.23 to about 6.42 percent by weight, a catalyst of ferric acetylacetonate of dibutyltin dilaurate in an amount from about 0.89 to about 1.15 percent by weight respectively, and a thixotropic agent in an amount of about 4.48 by weight.

3 Claims, No Drawings

METHOD OF APPLYING A FIBER OPTIC ADHESIVE TO A FIBER OPTIC MATERIAL

DEDICATORY CLAUSE

The invention described herein may be manufactured, used, and licensed by or for the Government for governmental purposes without the payment to me of any royalties thereon.

CROSS REFERENCE TO RELATED APPLICATION

This is a division of application Ser. No. 07/584,664, filed Sep. 14, 1990, now pending.

BACKGROUND OF THE INVENTION

A guidance system for a recently developed missile system employs a glass fiber optic to transmit the signal from the launch site to the missile in flight. A missile systems which employs such a signal transmission system is the Fog-M (i.e., fiber optic guided missile). The fiber optic or glass fiber is connected at one end to the missile guidance system and to the signal source at the other end. The fiber optic is wound on a bobbin from which the fiber optic payout takes place during missile flight. The signal is transmitted through the wound fiber optic material on the bobbin to link the missile during flight with the signal source.

The glass fiber is produced from a high purity silica preform rod wherein the preform rod is heated to its yield point at about 2000° C., and a fiber is drawn from the heated preform. The manufacturing process must be controlled to produce fibers of uniform diameter and mechanical strength. For example, a mechanical strength of optical fibers in excess of $2 \times 10^5$ psi is a desirable feature for certain specialized application (e.g., optical waveguides employing lengths of fiber).

Both mechanical strength of the fiber when manufactured and the ability of the fiber to retain its strength when stored are equally important. During storage the loss of mechanical property values can take place in addition to the loss during fiber drawing. Lack of mechanical strength is due to submicron flaws in the surface attributed, mainly, to chemical attack by atmospheric contaminants (e.g., moisture) during and after fiber drawing. Attempts to solve these problems have been studied by applying organic coating to the fiber following the drawing of the fiber. Failure resulted because those organic coatings are not impervious to moisture or hydroxy penetration. The penetration by moisture or hydroxy resulted in reduced strength of the coated fiber during periods of storage and/or use.

U.S. Pat. No. 4,227,907 issued to James A. Merritt and assigned to the United States of America as represented by the Secretary of the Army, Washington, D.C. disclosed a laser photochemical synthesis coating on optical fiber. As described hereinabove, the fiber which is drawn from a heated preform is immediately hermetically sealed with a layer of silicon nitride of about 0.02 to about 0.20 micrometer thickness. The $Si_3N_4$ is deposited by laser photochemical reactions which forms the $Si_3N_4$ on the freshly drawn silicon optical fibers in an atmospheric controlled chamber in a continuous operation which employs the reactant gases, $SiH_4$ and $NX_3$, wherein x is selected from hydrogen and/or fluorine.

The drawn fiber optic material when received from the manufacturer is coated with a buffer coat which can be an organic compound (e.g., methyl methacrylate, epoxy acrylates (Desota 95 008), polyimides, polyquinolines, and polsilazanes), or an inorganic compound such as $Si_3N_4$. The drawn fiber optic material has a diameter from about 80 to 125 microns or from about 80 to 125 micrometers. The buffer coat when of organic origin adds to this diameter to a total diameter of fiber optic material plus buffer coat to equal about 250 microns. The inorganic coated fiber optical material when coated by the laser photochemical synthesis method increases the diameter by a smaller amount since the coating of $Si_3N_4$ ranges from about 0.02 micrometers to about 0.20 micrometers.

An additional requirement for glass fiber coated with a buffer coat prior to being wound on a bobbin is to ensure that the fiber optic materials payout evenly from the bobbin to avoid breakage or malfunction of the fiber optic connection between the missile and the signal source sending the signal.

Advantageous would be material for which easy application in the form of a coating is achieved and which provides enough adhesive qualities to the fiber optic material having the buffer coating to thereby hold the fiber optic material in place on the bobbin during storage under wide variations temperatures and vibration conditions. Of particular advantage and a requirement for proper functioning is to provide a material which imparts adequate adhesive properties to allow consistent and uniform payout of optical fiber over wide temperature ranges and after storage at a wide range in temperature ($-65°$ F. to $+165°$).

SUMMARY OF THE INVENTION

An adhesive composition is applied to a fiber optic having a buffer coat thereon and is, subsequently, partially cured to a tacky outer surface prior to being wound onto a bobbin from which the adhesively coated fiber optic material is to payout during use. The adhesively coated fiber optic material is partially cured while being wound onto a bobbin. The fully cured adhesive composition functions to hold the fiber optic material in place on the bobbin during storage and allows consistent payout during use of the fiber optic material. The fiber optic material is employed in combination with a missile system wherein the fiber optic transmits a signal during missile flight to the guidance system of the missile from a signal source at the launch site.

Hydroxyterminated polybutadiene polymer (HTPB R45M) is employed without solids normally employed in solid propellant compositions but with isocyanate curing agent, selected catalysts, and thixotropic agent. The combination is subjected to variable cure temperatures as supplemented with optional ultraviolet (UV), or laser light to achieve a tacky cure to a rubbery material. The HTPB with isocyanate, catalyst ingredient, and the thixotrope are applied in an uncured state to the fiber optic material and cured to the required tacky state while being wound on a bobbin. After curing the rubbery material functions as an adhesive to control payoff and thus prevents the fiber material from completely sticking together or becoming unwound on the bobbin in storage.

The typical composition of the fiber optic adhesive comprises hydroxyterminated polybutadiene from about 88.14 to about 92.48 percent by weight, isophorone diisocyanate from about 6.23 to about 6.42 percent by weight, a catalyst of ferric acetylacetonate or dibutyltin dilaurate in an amount from about 0.89 to about 1.15 percent by weight respectively, and a thixotropic agent in an amount of about 4.48 by weight.

DESCRIPTION OF THE PREFERRED EMBODIMENT(S)

Hydroxyterminated polybutadiene is blended with an isocyanate curing agent, a catalyst selected from dibutyltin dilaurate and ferric acetylacetonate, and a thixotropic agent of a hydrogenated castorwax (i.e., hydrogenated castor oil) to yield a fiber optic adhesive. This adhesive is prepared at the time just prior to its use for coating a fiber optic which is cured to a tacky outer surface and subsequently wound on a bobbin. The tacky state allows the fiber optic to pay out evenly from a bobbin as the missile, to which the fiber optic is connected, travels to a target.

The following examples illustrate mixes with and without a thixotropic agent.

|  | PARTS | PERCENT BY WEIGHT | NCO H RATIO |
|---|---|---|---|
| EXAMPLE I | | | |
| COMPOSITION "A" INGREDIENTS | | | |
| Hydroxyterminated polybutadiene (HTPB-R45M) | 10.00685 | 92.48 | |
| Isophorone dissocyanate (IPDI) | 0.71269 | 6.59 | 7.12* |
| Ferric acetylacetonate (FeAA) | 0.10077 | 0.93 | |
| Thixotropic agent (Thixatrol ST) | 0 | | |
| TOTAL | 10.82031 | 100.00 | |
| EXAMPLE II | | | |
| COMPOSITION "B" INGREDIENTS | | | |
| Hydroxyterminated polybutadiene (HTPB-R45M) | 10.03615 | 88.20 | |
| Isophorone dissocyanate (IPDI) | 0.73010 | 6.42 | 7.28* |
| Ferric acetylacetonate (FeAA) | 0.10161 | 0.89 | |
| Thixotropic agent (Thixatrol St) | 0.51103 | 4.49 | |
| TOTAL | 11.37889 | 100.00 | |
| EXAMPLE III | | | |
| COMPOSITION "C" INGREDIENTS | | | |
| Hydroxyterminated polybutadiene (HTPB-R45M) | 10.01801 | 92.30 | |
| Isophorone dissocyanate | 0.71856 | 6.62 | 7.17* |
| Dibutyltin dilaurate (DBTDL) | 0.11772 | 1.08 | |
| Thixotropic agent (Thixatrol ST) | 0 | | |
| TOTAL | 10.85429 | 100.00 | |
| EXAMPLE IV | | | |
| COMPOSITION "D" INGREDIENTS | | | |
| Hydroxyterminated polybutadiene (HTPB-R45M) | 10.01134 | 88.14 | |
| Isophorone dissocyanate | 0.70740 | 6.23 | 7.07* |
| Dibutyltin dilaurate (DBTDL) | 0.13089 | 1.15 | |
| Thixotropic agent (Thixatrol ST) | 0.50843 | 4.48 | |
| TOTAL | 11.35806 | 100.00 | |
| EXAMPLE V | | | |
| COMPOSITION "E" INGREDIENTS | | | |
| Hydroxyterminated polybutadiene | 10.00245 | 89.15 | |
| Isophorone dissocyanate | 0.71426 | 6.37 | 7.15* |
| Thixotropic agent (Thixatrol St) | 0.50229 | 4.48 | |
| TOTAL | 11.21900 | 100.00 | |

*grams of IPDI/100 grams R45M

Example I, Composition "A", without a thixotropic agent felt stiffer on mixing than did Example II, Composition "B". After placing each composition on a fiber optic and curing for about 40 minutes in an oven at 60° C. both compositions A and B cured to a tacky surface.

Example II, Composition "C", employing dibutyltin dilaurate (DBTDL) as a catalyst but without a thixotropic agent was very stiff after 30 minutes cure at 58° C. The comparable sample, Example IV, Composition "D", which employed a thixotropic agent was more flexible after curing than sample "C" without the thixotropic agent.

Example V, Composition "E", after curing for 1¾ hours without a catalyst was similar to the basic polymer (R45M) cured with IPDI, but this Composition "E" was slightly more flexible with a tacky surface also.

The higher weight percent range of HTPB with an NCO/OH ratio from about 7.07 to about 7.28 grams of IPDI per 100 grams of HTPB, a higher amount of catalyst selected from ferric actylacetonate or dibutyltin dilaurate in amount of 0.89 and of 1.15 weigh percent respectively, and a thixotropic agent of a hydrogenated castorwax or castor oil from about 4.48 to about 4.49 weigh percent yields a product cured with a tacky outer surface to achieve a new result in controlling the payout from a bobbin when in use for its intended function with a fiber optic guided missile and also a necessary function when in storage to prevent the bobbin from unwinding or preventing malfunctioning while the bobbin is in storage such as sticking of fiber optic material together.

I claim:

1. A method of applying a fiber optic adhesive to a fiber optic material prior to its being wound on a bobbin to achieve even payout of the fiber optic as it is being employed to transmit a signal to a missile in flight, said method comprising:
   (i) providing a fiber optic material to which said fiber optic adhesive is to be applied which comprises a glass fiber produced from a high purity silica preform rod by being drawing from said high purity silica preform rod which is heated to its yield point at about 2000° C., said fiber optic material prior to having said fiber optic adhesive applied being said drawn fiber optic material having a diameter from about 80 to about 125 micrometer, said drawn fiber optic material being coated with a buffer coating selected from an organic compound or an inorganic compound, said buffer coating when selected from an organic compound being selected from the organic compounds consisting of methyl methacrylate, epoxy acrylates, polyimides, polyquinolines, and polysilazanes, said buffer coating when selected from an inorganic compound being $Si_3N_4$, said drawn fiber optic material plus buffer coating of an organic compound having a diameter up to about 250 micrometers and said drawn fiber optic material plus buffer coating of an inorganic compound having a diameter up to about 145 micrometers;

(ii) applying a fiber optic adhesive to said provided fiber optic material, said fiber optic adhesive when applied to said provided fiber optic material consisting of:

(a) hydroxyterminated polybutadiene from about 88.14 to about 92.48 weight percent;

(b) isophorone diisocyanate to provide an NCO to OH ratio from about 7.07 parts to about 7.28 isophorone diisocyanate per 100 parts of hydroxyterminated polybutadiene;

(c) a catalyst selected from ferric acetylacetonate or dibutyltin dilaurate in an amount of about 0.89 and 1.15 weight percent respectively; and, (d) a thixotropic agent of a hydrogenated castor oil of 4.48 weight percent when said dibutyltin dilaurate is 1.15 weight percent and of 4.49 weight percent when said ferric acetylacetonate is 0.89 weight percent;

(iii) winding on a bobbin said fiber optic material having said applied fiber optic adhesive; and, (iv) curing said fiber optic adhesive for a time period from about 30 to 40 minutes at a temperature from about 58° C. to 60° C. to produce a cured adhesive having a tacky outer surface to achieve even payout of said fiber optic as it is being employed to transmit a signal to a missile in flight.

2. The method as defined in claim 1 where said fiber optic adhesive as set forth therein consists of said hydroxyterminated polybutadiene of about 88.14 weight percent; said isophorone diisocyanate of about 6.23 weight percent which is about 7.07 parts per 100 parts of hydroxyterminated polybutadiene; said catalyst selected is dibutyltin dilaurate in said weight percent; and said thixotropic agent in said weight percent.

3. The method as defined in claim 1 wherein said fiber optic adhesive as set forth therein consists of said hydroxyterminated polybutadiene of about 88.20 weight percent; said isophorone diisocyanate of about 6.42 weight percent which is about 7.28 parts per 100 parts of hydroxyterminated polybutadiene; said catalyst selected is ferric acetylacetonate in said weight percent; said thixotropic agent in said weight percent.

* * * * *